United States Patent [19]

Backlund

[11] 4,315,496

[45] Feb. 16, 1982

[54] APPARATUS FOR STORAGE AND RECOVERY OF LOW TEMPERATURE THERMAL ENERGY

[76] Inventor: Anders D. Backlund, Holmen, S-820 90 Ytterhogdal, Sweden

[21] Appl. No.: 37,251

[22] Filed: May 9, 1979

[30] Foreign Application Priority Data

May 12, 1978 [SE] Sweden .............................. 7805459

[51] Int. Cl.³ ............................................... F24J 3/02
[52] U.S. Cl. ...................................... 126/415; 165/45
[58] Field of Search ............. 126/415, 430, 436, 400, 126/417; 165/45; 62/260

[56] References Cited

U.S. PATENT DOCUMENTS

| 82,651 | 9/1868 | Somes | 165/45 |
|---|---|---|---|
| 3,195,619 | 7/1965 | Tippmann | 165/45 |
| 4,091,800 | 5/1978 | Fletcher et al. | 126/415 |
| 4,103,368 | 8/1978 | Lockshaw | 126/415 |

FOREIGN PATENT DOCUMENTS

| 2657244 | 7/1977 | Fed. Rep. of Germany | 126/415 |
|---|---|---|---|
| 820705 | 11/1937 | France | 126/415 |
| 7620830 | 3/1978 | France | 126/415 |

Primary Examiner—Carroll B. Dority, Jr.
Attorney, Agent, or Firm—Steele, Gould & Fried

[57] ABSTRACT

A novel method and device is provided herein for improved storage and recovery of low temperature thermal energy from a mass capable of storing such energy by heat exchange with a heat carrying medium, e.g. in combination with a heat pump. The conduit system for the heat carrying medium is arranged at the underside of a continuous bed which is placed on or in said mass, the latter being e.g. a body of water, watery or solid ground. The bed is preferably a floating plate construction of heat insulating material. Preferably at least part of the upper side of the bed is arranged to absorb solar radiation, which energy is transferred to said mass by washing the bed surface with water from the mass or another source. Especially on water or watery ground the bed may provide a support for e.g. plantations, grounds for ball sports etc.

7 Claims, 1 Drawing Figure

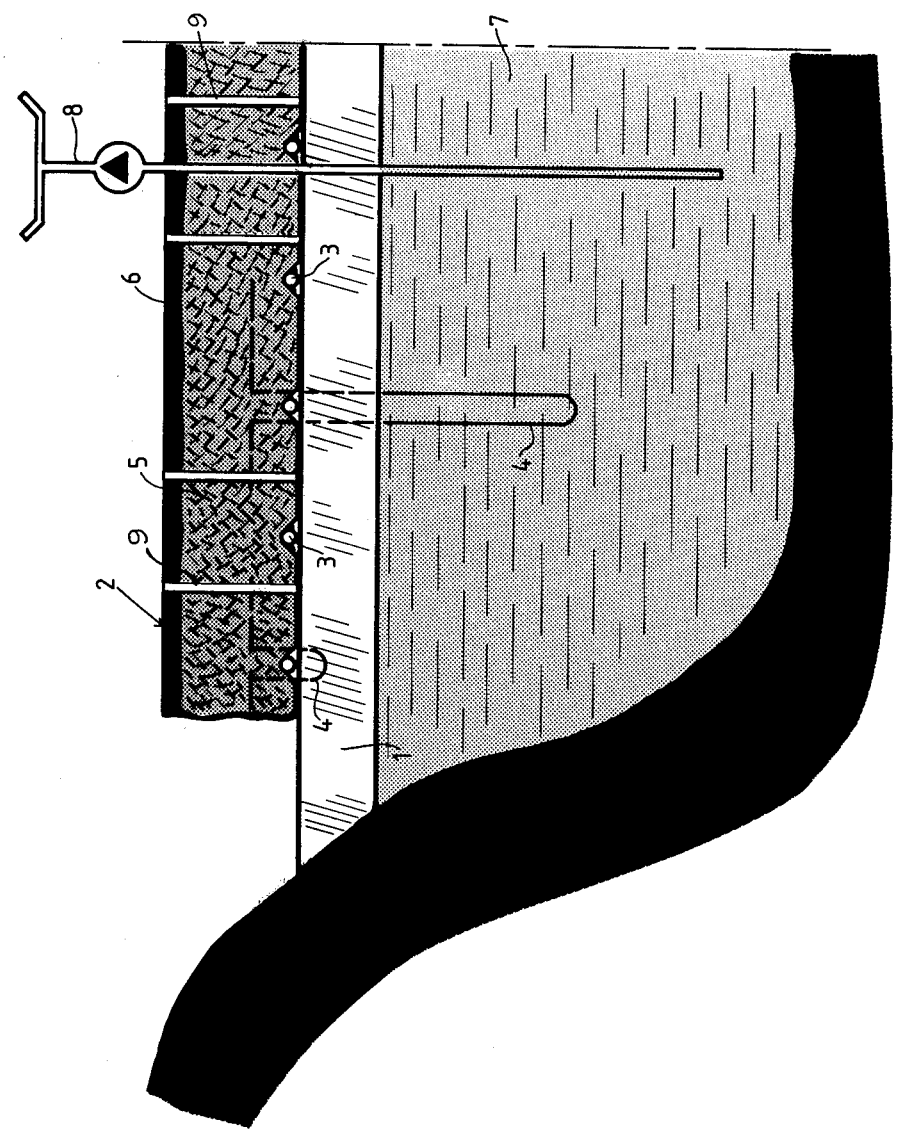

APPARATUS FOR STORAGE AND RECOVERY OF LOW TEMPERATURE THERMAL ENERGY

BACKGROUND OF THE INVENTION

1. Field of the Invention

The present invention relates to an improved method of utilizing a low temperature medium, such as ground, watery ground or open water, as an energy source and energy accumulator respectively, as well as a device therefore.

PRIOR ART

The use of low temperature media such as marshes, tarns etc. through heat exchange with a heat carrying medium has up to now been associated with certain difficulties. If the system of pipes or the like, in which the heat carrying medium is circulated, for example is positioned adjacent to the bottom of the tarn etc. without being properly fixed, the piping system may be displaced and damaged, when black ice is formed around the pipes. Properly fixing or embedding pipes is very costly. In both cases the low temperature medium in question is also poorly utilized. Large amounts of energy are lost, for example, through naturally occurring heat emission and freezing especially in the winter time.

According to the invention there is therefore suggested a method and a device for a very simple way of better utilizing especially such low temperature media as watery grounds, open water, marshes, tarns and lakes for the recovery and storage of low temperature energy, but the method and the device according to the invention may also be used on solid ground, for example in connection with a building to utilize the loss heat from floors of the building as well as surrounding ground heat.

SUMMARY OF THE INVENTION

According to a basic concept of the invention the heat exchange system, which may consist of pipes, tubes, hoses of suitable material etc., is arranged at the underside of a solid bed, which is placed on or in the low temperature medium to be used as a heat energy source/heat accumulator. The solid bed can e.g. be in the form of a bridge, a plate, a casette or the like. If at the same time a fixed tubing system, which easily can be arranged on or in the low temperature medium in question, is arranged in a simple fashion, it will be possible to utilize the low temperature medium more efficiently by the fact that, for example in case of a body of water, all the underlying liquid volume can be utilized and that losses upwardly through the bridge etc. are prevented depending on the heat insulating properties of the bed. Furthermore the very bed may, when placed on the low temperature medium concerned, be used for different purposes, such as a solar energy collector, for plantations, road connections etc.

By making the surface of the bed heat absorbing and occasionally washing it with water from e.g. the tarn, watery ground etc. on which it is arranged, (or from other water), a significant contribution can be given to the absorption of solar energy by the low temperature medium.

The bed can be made with varying properties according to the needs from simple and cheap beds to more expensive and composite beds for several functions. They may for example be made light, watertight, more or less heat insulating etc. and with varying buoyancy to support different loads. A suitable material is for example plastic foam or plastic foam bonded to peat or another suitable material.

The method and the device according to the invention can be used in all situations where low temperature energy is recovered or stored. The low temperature medium may for example function as a warm or cold heat accumulator for energy conversion, as an energy source for a passive heating system with a "climate cage" as is described for example in my German "Offenlegungsschrift" P 27 29 635.1 which is incorporated by reference herein, or in connection with a heat pump for supply of energy to the evaporator.

When using the invention on solid ground, for example as mentioned above to utilize loss heat from buildings, the bed, which in this case is heat insulating, with the attached tubing system is preferably arranged immediately underneath the topsoil layer as a skirt extending out from the building. The tubing system can hereby be fixed with a minimum of digging work, at the same time as heat losses through the surface layer of the ground are avoided. The ground heat may for example be utilized for heating fresh air which is led through the tubing system. The bed may be provided with small vertical through holes for the penetration of water, which has been heated for instance by washing on a sun heated roof or the like. To improve the capacity of the ground layer in question as a heat source and accumulator, the water binding ability of the ground may be increased by soaking it with water, which has been thickened with some water absorbing agent, e.g. cellulose ethers, starch and derivatives thereof etc.

BRIEF DESCRIPTION OF THE DRAWINGS

The method and the device according to the invention will now be described in more detail with reference to a specific embodiment of the invention, to which it, however, is not restricted in any way. Reference is hereby made to the accompanying drawing, showing a section of a part of a device according to the invention placed on an ice-covered water body, e.g. a tarn or the like which has been "sacrificed" for the future serve as a producer and accumulator of low temperature thermal energy.

DETAILED DESCRIPTION OF THE PREFERRED EMBODIMENTS

The device of the invention outlined in the drawing comprises in its simpliest design a bridge, casette or plate 2 of suitable material, e.g. plastic foam or plastic foam bonded to peat, which on its underside has a fixed horizontal tubing system 3 for the heat carrying medium, which is in heat exchanging relationship with the mass of water 7. The heat carrying medium may for example be air or freezing point depressed water, such as a glycol/water-mixture. The tubing system 3 is further provided with coupling means, not shown, preferably on the upper side of the bridge 2, for the connection of the tubing system 3 to, for instance, the evaporator of a heat pump (heat pumps) through suitable conduits.

In the illustrated embodiment the bridge 2 with the tubing system 3 is placed on an ice coating 1 on the body of water 7. The manufacture of the bridge, casette or plate 2 can take place on land in sections, which subsequently are transported out on to the water body 7 for assembly, but the simplest way is to build it directly on the spot, e.g. under a tent in winter when the water 7 has bearing ice. In the latter case, in one method of manufacture, the tubes or hoses 3 of the tubing system necessary for the energy transport are first placed on the ice 1, possibly together with fixing hangers 4 as is stated below. The tubes or hoses 3 are then covered with peat litter or another suitable material, whereupon a liquid binding agent, e.g. plastic foam forming liquids, are sprayed over the peat layer. Thereby there is formed in a short time, generally a few minutes, a plastic foam glue bonded peat mass 5, at the underside of which the tubing system 3 is fixed. The bridge 2 obtained has a good buoyancy and good heat insulating properties and will well resist influence of weather, wind, water, etc. When the tubing system 3 has been connected to the inlet and outlet conduits for the heat carrying medium, low temperature thermal energy may be withdrawn from the water 7 as long as there is unfrozen water.

In order to increase the absorption of heat energy from the surroundings by the mass of water 7, a pump-/watering system 8 may be used, which is arranged to wash the sun exposed upper surface of the bridge 2 with water from the body of water 7, when the temperature is higher above the bridge 2 than under it. To increase the radiation absorbing ability of the bridge 2 it may for example be dark coloured. In the described embodiment this may easily be achieved by coating the surface of the bridge 2 with e.g. plastic foam glue bonded dark or coloured sand 6. Holes or passages 9 may also be arranged in the bridge 2 to allow for the penetration of the water being washed over the bridge. Instead of washing water over the bridge 2, it may possibly, when there is a large accumulator volume at hand, be made of a less heat insulating material, so that the absorbed heat is conducted through the bridge 2 to the body of water 7.

The above described device can be used in the following way:

When the temperature above the bridge 2 is higher than under the bridge, the bridge is, normally from spring, periodically or continuously washed with water from the underside of the bridge by means of a pump-/watering device 8. Hereby the water temperature in 7 increases, (when ice possibly remaining under the bridge 2 has melted). In the summer time the ice coating 1 is gone and the bridge 2 then floats on the body of water 7. During the warm season the body of water 7 may be used for cooling the heat carrying medium circulated through the tubing system 3, which contributes to the heating of the water 7. During the cold season the heat stored in the body of water may then be utilized for different heating purposes, e.g. to give off heat to the evaporator side of a heat pump system through the heat carrying medium in the tubing system 3. When the temperature of the water 7 under the heat insulating bridge 2 has fallen to 0° C. through the withdrawal of energy, ice begins to form initially around the tubes or hoses 3 on continued heat withdrawal, and eventually a whole ice coating 1 under the bridge 2 is obtained. By the fact that the water 7 is frozen artificially by withdrawal of heat via the heat carrying medium, and that heat (including melting heat) is not lost to the surroundings by natural heat emission and freezing because of the insulating bridge 2, the heat storing capacity of the body of water 7 becomes great. Withdrawal of heat from the body of water 7 may then be continued, as long as there is unfrozen water.

Withdrawal of low temperature thermal energy in the winter time may take place e.g. between 0° and −5° C. If the surface of the body of water 7 and the bridge 2 is for example 100×100 m$^2$, and energy is withdrawn during the colder season, so that the thickness of the ice coating 1 has grown to 2 meters under the bridge 2, the energy take off excluding the heating of all the water and underlying bottom has been approximately two million kWh, which for example covers the low temperature thermal energy need for heating at least a hundred houses yearly by a heat pump in the north of Sweden. In practice, however, such a great ice thickness limits the heat transfer between the water and the tubing system 3 so much that despite good thermal conductivity too little energy is extracted. In order to manage effect peaks and at the same time be able to maximally utilize the energy capacity of the body of water enclosed under the bridge 2, the horizontal tubing system 3 is therefore suitably supplemented either with tubes or hoses 3, which for example by means of fixing hangers 4 fastened to the bridge 2 are arranged somewhat below the bridge (in the figure the fixing hangers 4 are shown in the position they take up, when the ice coating 1 has melted), or with a vertically arranged tubing system. For this purpose one may for example use twin tubes, which are put through evenly spaced holes in the bridge 2 and hang on the bridge in their connection tubes with couplings. These tubes and couplings are suitably hidden through specially arranged recesses in the bridge 2 and through the optionally applied surface layer 6.

To promote the melting of the ice formed under the bridge 2 or to increase the capacity and reduce the ice formation water may be pumped from an unused part of the body of water or from adjacent watery ground or water.

If desired, e.g. two bridge systems 2 may be arranged above one another with intermediate masses, so that energy may be taken off at two different temperature levels.

Instead of utilizing the surface 6 of the bridge 2 as a solar energy collector to be washed by water, at least part of it may be covered with mould for plantations etc. Large bridges etc. may in this way be used for example as grounds for ball sports etc. The bearing capacity of the bridge 2 may hereby be strengthened by seeing to it that the ice coating under the bridge always is kept at a necessary desired thickness even during the warm season. By intentionally preserving a thick bearing ice coating in this way during the whole year bridges etc. may be substituted. A larger plate or bridge system 2 may be used as a landing field. It may further serve as a ground for houses.

The invention is of course not restricted to the embodiment described above and shown in the drawing, but many variations and modifications are possible within the scope of the general inventive idea.

What I claim is:

1. An apparatus for storing and recovering low temperature thermal energy from a mass which is at least sufficiently water saturated that a layer of ice forms thereover in cold ambient temperatures, comprising:
   a continuous bed of heat insulating material covering the mass, adapted to rest on the layer of ice, and adapted to float on water in the absence of ice;
   a conduit system disposed on the underside of, and carried by the bed, the conduit system being in heat exchanging relationship with at least one of the water and the layer of ice;

a heat carrying medium flowing in the conduit system for extracting low temperature thermal energy directly from the mass, inducing an accelerated production of ice in cold ambient temperatures, the conduit system having an intake and outlet for routing the medium from and to an area to be heated, the apparatus being capable of cooling the area in warm ambient temperatures;

a layer of solar radiation absorbing materials overlaying the bed of insulating material, both materials having vertical passages therethrough; and, means for drawing cold water from beneath the bed and the layer of ice and spraying the water over the layer of solar radiation absorbing material, the sprayed water being heated before it percolates down through the passages in the bed, further heating the mass;

whereby low temperature energy for heating the area may be extracted from the mass even at sub-freezing ambient temperatures by the accelerated production of ice, and whereby the accelerated production of ice due to the extraction of low temperature energy for heating the area facilitates subsequent use of the mass for cooling the area in warmer temperatures.

2. An apparatus according to claim 1, wherein the bed comprises plastic foam.

3. An apparatus according to claim 1, wherein the bed material comprises plastic foam bonded to peat.

4. An apparatus according to claim 1, wherein the bed material is sufficiently strong and sufficiently buoyant to form a load bearing surface under all ambient temperatures for buildings, roads and the like.

5. An apparatus according to claim 1, wherein the bed material comprises peat.

6. An apparatus according to claim 5, further comprising means carried by the bed for supporting the tubes of the conduit system at different depths within the mass.

7. An apparatus according to claim 1, wherein the conduit system comprises substantially horizontally arranged tubes fixed directly in the bed material.

* * * * *

UNITED STATES PATENT AND TRADEMARK OFFICE
CERTIFICATE OF CORRECTION

PATENT NO. : 4,315,496

DATED : 02/16/82

INVENTOR(S) : Anders D. Backlund

It is certified that error appears in the above-identified patent and that said Letters Patent are hereby corrected as shown below:

Column 6, line 14, "5" should read --7--.

Signed and Sealed this

Sixth Day of July 1982

[SEAL]

Attest:

GERALD J. MOSSINGHOFF

Attesting Officer

Commissioner of Patents and Trademarks